US009521353B2

(12) United States Patent
Yoneyama et al.

(10) Patent No.: US 9,521,353 B2
(45) Date of Patent: Dec. 13, 2016

(54) RECORDER

(71) Applicant: YOKOGAWA ELECTRIC CORPORATION, Musashino-shi, Tokyo (JP)

(72) Inventors: Toshiaki Yoneyama, Musashino (JP); Yasuhiro Yoshino, Musashino (JP); Noriaki Idenoshita, Musashino (JP)

(73) Assignee: YOKOGAWA ELECTRIC CORPORATION, Tokyo (JP)

( * ) Notice: Subject to any disclaimer, the term of this patent is extended or adjusted under 35 U.S.C. 154(b) by 298 days.

(21) Appl. No.: 14/231,931

(22) Filed: Apr. 1, 2014

(65) Prior Publication Data

US 2014/0293044 A1 Oct. 2, 2014

(30) Foreign Application Priority Data

Apr. 2, 2013 (JP) ................. 2013-076944

(51) Int. Cl.
| H04N 5/77 | (2006.01) |
| H04N 9/82 | (2006.01) |
| G11B 27/034 | (2006.01) |
| H04N 5/76 | (2006.01) |

(52) U.S. Cl.
CPC ............. *H04N 5/76* (2013.01); *G11B 27/034* (2013.01); *H04N 5/772* (2013.01); *H04N 9/8205* (2013.01)

(58) Field of Classification Search
None
See application file for complete search history.

(56) References Cited

U.S. PATENT DOCUMENTS

| 8,902,315 | B2* | 12/2014 | Fisher | ................. | H04M 1/6066 348/164 |
| 2007/0171294 | A1* | 7/2007 | Watanabe | ............ | H04N 5/3572 348/340 |
| 2007/0225931 | A1* | 9/2007 | Morse | ................ | G02B 23/2469 702/127 |
| 2010/0259608 | A1* | 10/2010 | Knuuttila | ............. | G01B 21/042 348/135 |
| 2012/0052563 | A1* | 3/2012 | Liang | ..................... | H04N 7/183 435/287.2 |

(Continued)

FOREIGN PATENT DOCUMENTS

| JP | 1-196516 A | 8/1989 |
| JP | 2000-346881 A | 12/2000 |

(Continued)

*Primary Examiner* — Reza Aghevli
(74) *Attorney, Agent, or Firm* — Sughrue Mion, PLLC

(57) ABSTRACT

A recorder includes a file saving processor configured to record measurement data in a first file in time series, to temporarily store image data with information for associating the image data with the measurement data that is regarded as being received at the same time, to record image data corresponding to a point in time when a trigger is generated and also a given number of image data before the trigger is generated and a given number of image data after the trigger is generated, in the temporarily stored image data, in a second file, to create a third file in which the measurement data recorded in the first file and the image data recorded in the second file are associated with each other, and to associate the first file, the second file, and the third file with each other to save the associated files.

11 Claims, 20 Drawing Sheets

(56) References Cited

U.S. PATENT DOCUMENTS

| 2013/0010105 A1* | 1/2013 | Lewis | G01J 3/02 |
| | | | 348/135 |
| 2013/0219696 A1* | 8/2013 | Kurita | H01R 43/26 |
| | | | 29/593 |
| 2014/0028819 A1* | 1/2014 | Nakano | A61B 1/00009 |
| | | | 348/65 |

FOREIGN PATENT DOCUMENTS

| JP | 2005-285288 A | 10/2005 |
| JP | 2007-28344 A | 2/2007 |
| JP | 2010-072739 A | 4/2010 |

* cited by examiner

FIG. 2

TIME-SERIES MEASUREMENT VALUE BUFFER 151

| | | | | |
|---|---|---|---|---|
| 151a — MEASUREMENT VALUE NUMBER | 1 | 2 | | 516 |
| 151b — TIME | TIME(1) | TIME(2) | | TIME(516) |
| 151c — MEASUREMENT VALUE | MEASUREMENT VALUE(1) | MEASUREMENT VALUE(2) | | MEASUREMENT VALUE(516) |

FIG. 4

IMAGE-ATTACHED MEASUREMENT VALUE FILE (ARCHIVE) 190

TIME-SERIES MEASUREMENT VALUE FILE 191

| 191a | MEASUREMENT VALUE NUMBER | 1 | 2 | 516 | ... |
| --- | --- | --- | --- | --- | --- |
| 191b | TIME | TIME(1) | TIME(2) | TIME(516) | ... |
| 191c | MEASUREMENT VALUE | MEASUREMENT VALUE(1) | MEASUREMENT VALUE(2) | MEASUREMENT VALUE(516) | ... |

NUMBERED IMAGE FILE 192

192a — IMAGE NUMBER(1), IMAGE NUMBER(2), ... IMAGE NUMBER(m), ... IMAGE NUMBER(s)
192b

FILE MANAGEMENT DATA 193

| 193a | FILE MANAGEMENT NUMBER | 1 | 2 | k | ... |
| --- | --- | --- | --- | --- | --- |
| 193b | MEASUREMENT VALUE NUMBER | 500 | 504 | MEASUREMENT VALUE NUMBER(k) | ... |
| 193c | IMAGE NUMBER | 1 | 2 | IMAGE NUMBER(k) | ... |

TRIGGER GROUP MANAGEMENT DATA 194

| 194a | TRIGGER GROUP MANAGEMENT NUMBER | 1 | | p | |
| --- | --- | --- | --- | --- | --- |
| 194b | LEADING FILE MANAGEMENT NUMBER | 1 | | p1 | |
| 194c | TRIGGER POINT FILE MANAGEMENT NUMBER | 100 | | p2 | ... |
| 194d | ENDING FILE MANAGEMENT NUMBER | 200 | | p3 | |
| 194e | IMAGE NUMBER | 200 | | p4 | |
| 194f | IMAGE CUMULATIVE NUMBER | 200 | | p5 | |

*FIG. 20*

TIME-SERIES MEASUREMENT VALUE FILE 361

| TIME(1) | TIME(2) | ... | TIME(K) | ... |
|---|---|---|---|---|
| MEASUREMENT VALUE(1) | MEASUREMENT VALUE(2) | ... | MEASUREMENT VALUE(K) | ... |

RECORDER

CROSS-REFERENCE TO RELATED APPLICATION(S)

The present application claims the benefit of priority of Japanese Patent Application No. 2013-76944 filed on Apr. 2, 2013. The disclosures of the application are incorporated herein by reference.

BACKGROUND

Technical Field

The present disclosure relates to a recorder that records a measurement value, and more particularly, to a recorder that has a function of recording an image in association with a measurement value.

Related Art

In plants such as a factory or a production facility, various measurements of temperature, a flow rate, pressure, or the like using a sensor have been performed, and recorders such as a paperless recorder are used to observe and record the measurement values thereof.

In addition, camera devices for industrial application have become widespread due to increased connectivity and price reduction of the camera devices, and thus capturing a moving image and a still image of a monitoring object by using a camera device in a plant has become widespread.

FIG. 18 is a diagram illustrating a configuration of a system that performs monitoring, on a monitoring object 450 within a plant, by collection of measurement values using a temperature sensor 430 and collection of images using a camera 410 having a digital communication output function.

Image data from the digital communication output camera 410 is input to a PC 460 through a general-purpose network communication path 400. Analog measurement data from the temperature sensor 430 is converted into digital measurement data in an A/D communication converter 440 and is input to a paperless recorder 300 through the network communication path 400. However, when the temperature sensor 430 outputs digital data, the A/D communication converter 440 is not necessary.

Image data input to the PC 460 is recorded in the PC 460 and is displayed on a display device of the PC 460. Measurement data input to the paperless recorder 300 is recorded in the paperless recorder 300 and is displayed on a display device of the paperless recorder 300.

FIG. 19 is a block diagram illustrating a configuration of the paperless recorder 300. The paperless recorder 300 can perform trend display for displaying in real time a value of measurement data that is input thereto and reproduction display for reading out and displaying a value of recorded measurement data.

As illustrated in the drawing, the paperless recorder 300 includes a digital communication module 310, an ADC 320, a measurement value input processor 330, a timepiece 340, a file saving processor 350, a file saving region 360, a file reproduction processor 370, a display processor 380, and a display device 390.

The digital communication module 310 receives measurement data through the network communication path 400. The ADC 320 directly receives measurement data from an analog output sensor (not shown) to perform digital conversion processing.

The measurement value input processor 330 performs input processing of the measurement data that is received by the digital communication module 310 or the ADC 320. The timepiece 340 specifies a time when the measurement data is received. The file saving processor 350 saves the measurement data as a time-series measurement value file 361 in the file saving region 360.

The file saving region 360 is a non-volatile storage region where the time-series measurement value file 361 as a recording result of the paperless recorder 300 is stored. As illustrated in FIG. 20, the time-series measurement value file 361 is a file in which a time when the measurement data is received and a measurement value are associated with each other and are recorded in time series.

The file reproduction processor 370 reads out the time-series measurement value file 361 from the file saving region 360 to perform reproduction processing, and transmits the time-series measurement value file to the display processor 380. The display processor 380 performs trend display processing based on the measurement data that is input by the measurement value input processor 330 and reproduction display processing of the measurement data using the file reproduction processor 370, and displays a waveform, a value, and the like on the display device 390.

RELATED ART DOCUMENT

Patent Document

[Patent Document 1] JP-A-2007-28344

It is possible to monitor the monitoring object 450 in real time using a measurement value and an image by the construction of the system illustrated in FIG. 18. In this case, in trend display, since a latest measurement value is displayed on the paperless recorder 300 and a latest image is displayed on the PC 460, the measurement value can be easily analyzed with reference to the image. For example, when an alarm is generated in the paperless recorder 300 by the value of the input measurement data, the image of the monitoring object 450 can be immediately referred to on the PC 460.

However, in a monitoring system of the related art, since measurement data and image data are recorded in separate devices, an image corresponding to a measurement value to be analyzed cannot be immediately referred to, for example, in a case where a recorded measurement value is analyzed later, a case where a waveform which is being displayed is analyzed slightly backwards, a case where the tendency of an alarm generated in the past is examined, which results in inconvenience.

For this reason, it is convenient if image data can be saved in association with measurement data in a recorder such as a paperless recorder. However, many pieces of image data of a monitoring object in a plant are not necessarily important in a later analysis due to a lack of changes and have a larger data size than measurement data. Thus, if image data which is consecutively input is simply saved in association with measurement data, a saving region of measurement data which is an original recording object may be suppressed.

SUMMARY

Exemplary embodiments of the invention provide a recorder which can effectively record an image in association with a measurement value.

A recorder which receives measurement data and image data, according to an exemplary embodiment, comprises:

a file saving processor configured to record the measurement data in a first file in time series, to temporarily store the image data with information for associating the image data with the measurement data that is regarded as being received at the same time, to record image data corresponding to a point in time when a trigger is generated and also a given number of image data before the trigger is generated and a given number of image data after the trigger is generated, in the temporarily stored image data, in a second file, to create a third file in which the measurement data recorded in the first file and the image data recorded in the second file are associated with each other, and to associate the first file, the second file, and the third file with each other to save the associated files.

The recorder may further comprise:

a display processor configured to control a display device to display a waveform of measurement data which is being received, wherein the display processor is configured to control the display device to additionally display a mark on the measurement data with which the temporarily stored image data is associated.

In the recorder, when a selection of the mark is received, the display processor may control the display device to display image data that is associated with measurement data corresponding to the selected mark.

The recorder may further comprise:

a reproduction processor configured to control a display device to display a waveform of the measurement data recorded in the first file, wherein the reproduction processor is configured to control the display device to additionally display a mark on the measurement data with which the image data recorded in the second file is associated.

In the recorder, when a selection of the mark is received, the reproduction processor may control the display device to display image data that is associated with measurement data corresponding to the selected mark.

In the recorder, the file saving processor may be configured to archive the first file, the second file, and the third file in one file to associate the files with each other.

In the recorder, the file saving processor may be configured to record contents of the first file, the second file, and the third file in one file to associate the files with each other.

In the recorder, the trigger may be generation of an alarm which is caused by the received measurement data.

In the recorder, the trigger may be based on a user's operation.

In the recorder, the user's operation may be a selection for a waveform which is being displayed, and the file saving processor may be configured to regard a trigger as being generated at a time when measurement data to be selected in the waveform is received.

According to the exemplary embodiment of the invention, it is possible to effectively record the image in association with the measurement value in the recorder which records the measurement value.

BRIEF DESCRIPTION OF THE DRAWINGS

FIG. 2 is a diagram illustrating a data structure of a time-series measurement value buffer.

FIG. 4 is a diagram illustrating a data structure of an image-attached measurement value file.

FIG. 20 is a diagram illustrating a data structure of a related-art time-series measurement value file.

DETAILED DESCRIPTION

Figure 1:
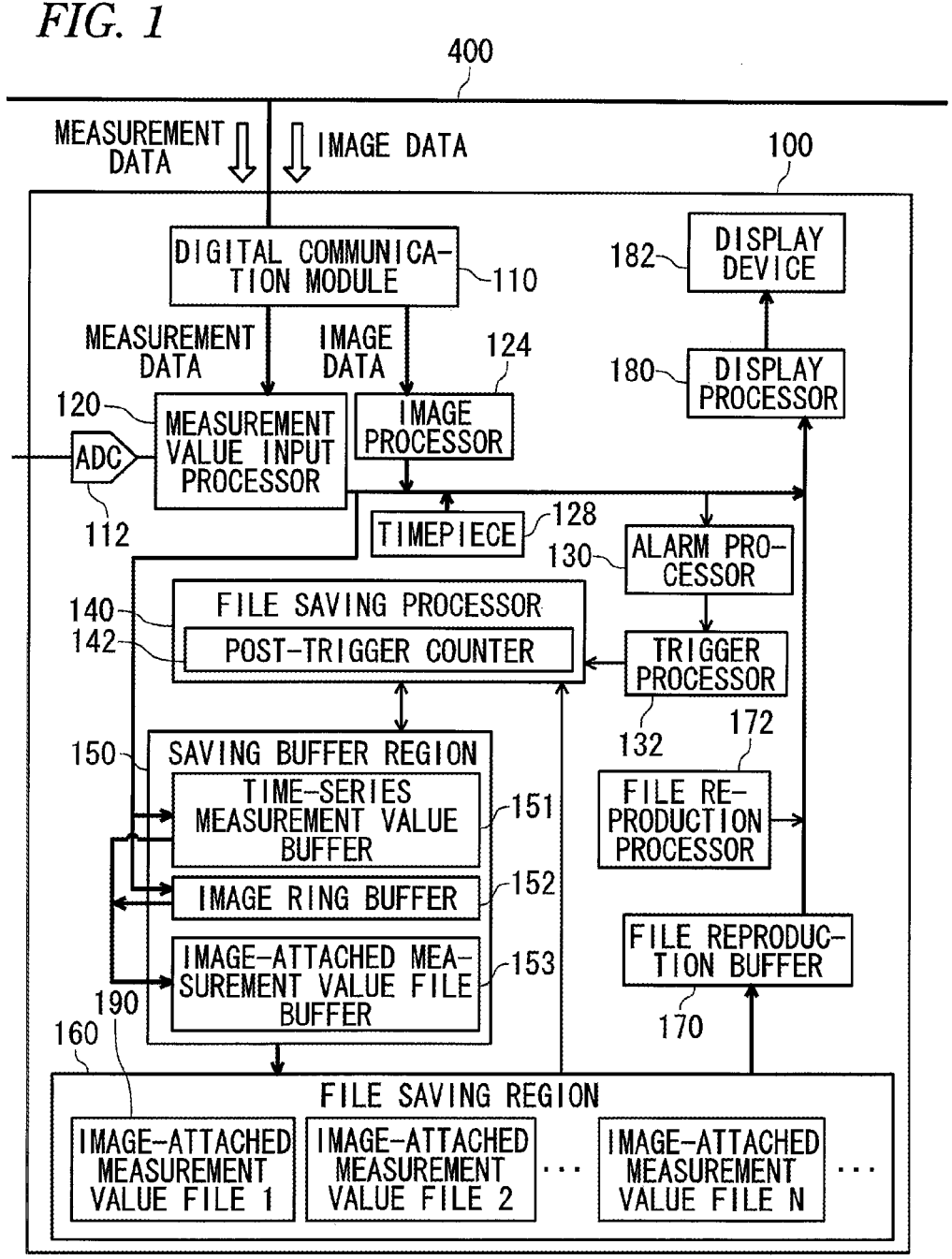
FIG. 1 is a block diagram illustrating a configuration of a paperless recorder according to an embodiment.

Hereinafter, an embodiment of the present invention will be described with reference to the accompanying drawings. In the embodiment, a description will be given of a case where a recorder of the present invention is applied to a paperless recorder. FIG. 1 is a block diagram illustrating a configuration of a paperless recorder 100 according to this embodiment.

As illustrated in the drawing, the paperless recorder 100 includes a digital communication module 110, an ADC 112, a measurement value input processor 120, an image processor 124, a timepiece 128, an alarm processor 130, a trigger processor 132, a file saving processor 140, a saving buffer region 150, a file saving region 160, a file reproduction buffer 170, a file reproduction processor 172, a display processor 180, and a display device 182.

Figure 18:
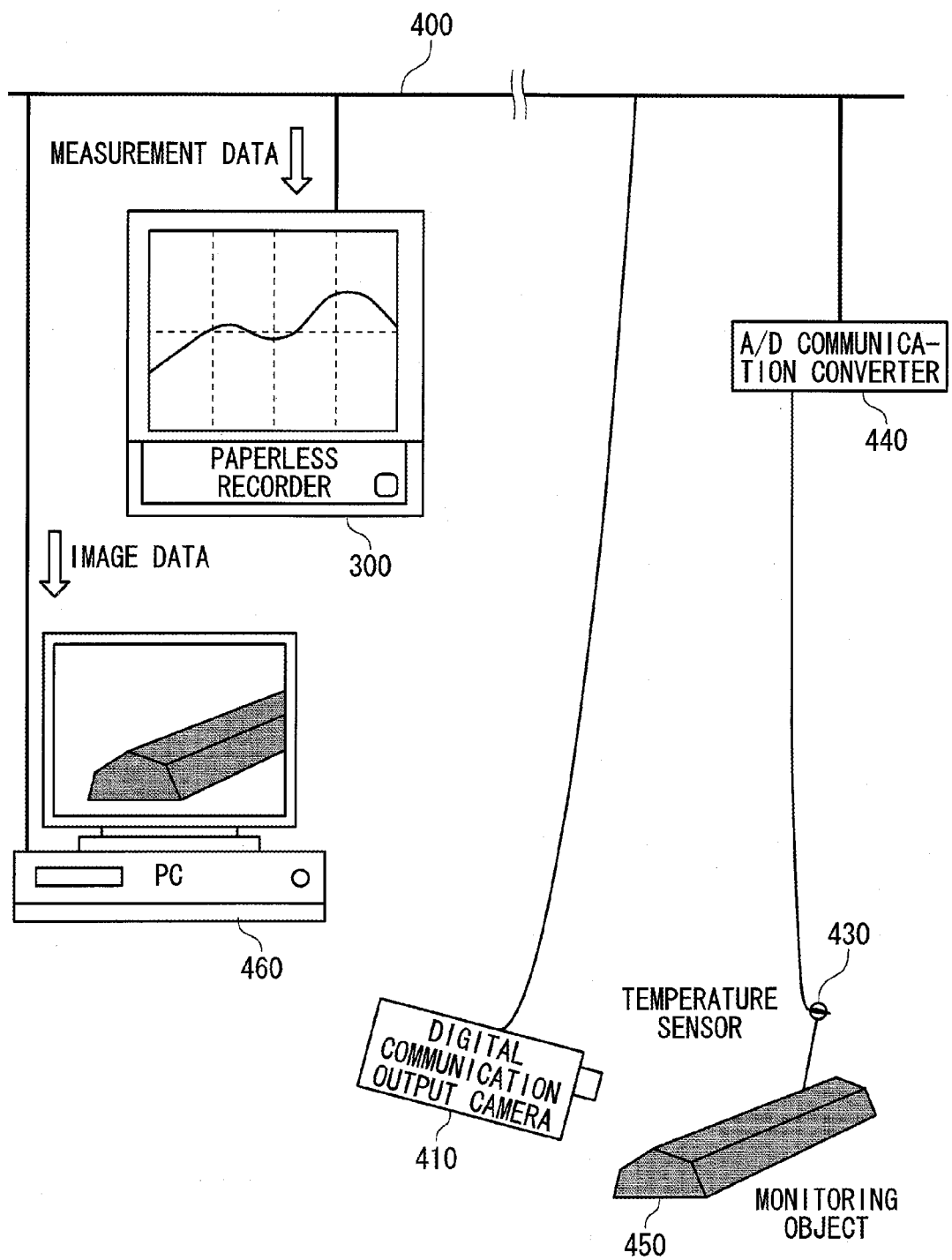
FIG. 18 is a diagram illustrating a configuration of a system that performs monitoring, on a monitoring object within a plant, by collection of measurement values using a temperature sensor and collection of images using a camera having a digital communication output function.
Figure 19:
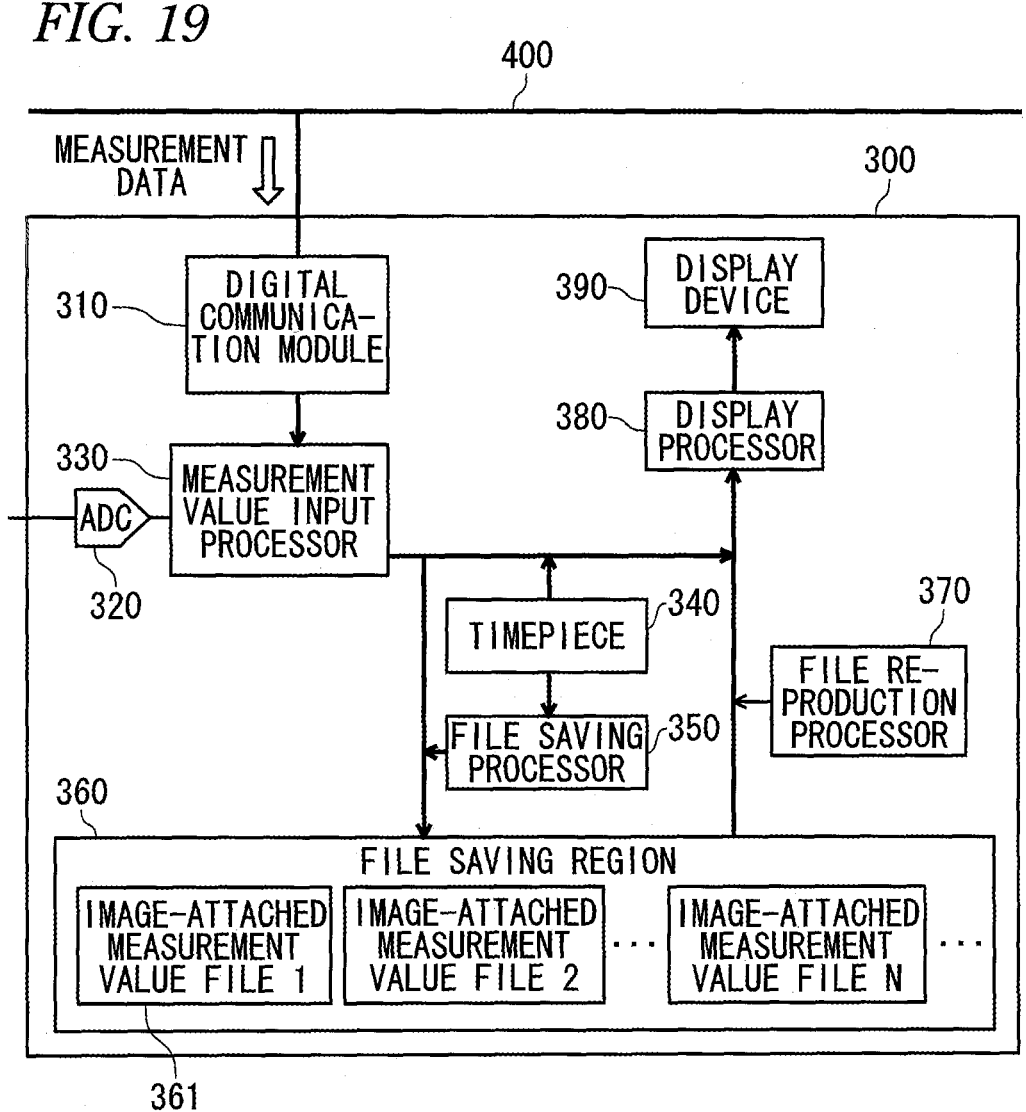
FIG. 19 is a block diagram illustrating a configuration of a related-art paperless recorder.

The digital communication module 110 performs data transmission and reception through the general-purpose network communication path 400 such as Ethernet (registered trademark). Although not shown in the drawing, the digital communication output camera 410 as illustrated in FIG. 18 and the AD communication converter 440 having the temperature sensor 430 connected thereto are connected to the network communication path 400, and the digital communication module 110 receives image data captured by the digital communication output camera 410 and measurement data measured by the temperature sensor 430. Any format and type of image data such as color, monochrome, or infrared light may be used.

The ADC 112 directly receives measurement data from an analog output sensor (not shown) to perform digital conversion processing. The measurement value input processor 120 inputs the measurement data received from the digital communication module 110 or the ADC 112 and stores the input data in the saving buffer region 150. The image processor 124 inputs the image data received by the digital communication module 110 and stores the input data in the saving buffer region 150. The timepiece 128 specifies a time when the measurement data and the image data are received.

When the input measurement data satisfies alarm conditions which are set in advance, the alarm processor 130 generates an alarm. The alarm conditions can be set depending on, for example, the range of a measurement value and the degree of change in the measurement value.

When the alarm processor 130 generates an alarm, the trigger processor 132 causes the file saving processor 140 to save image data that is input before and after the alarm is generated. In this embodiment, image data is saved using the generation of an alarm as a trigger of image saving. At this time, in addition to image data corresponding to the point in time of trigger generation (trigger time point), a given number of pieces of image data before the trigger time point and a given number of pieces of image data after the trigger time point are saved as one group. The given number of pieces of image data before the trigger time point in one group is defined as the number of pre-trigger image data. The given number of pieces of image data after the trigger time point in one group is defined as the number of post-trigger image data. The number of pre-trigger image data and the number of post-trigger image data are set in advance.

In this manner, in this embodiment, pieces of image data before and after the generation of an alarm which are beneficial to analysis of a measurement value, rather than all pieces of image data that are input, are set to be objects to be saved, and thus the image data can be effectively recorded.

The file saving processor 140 saves measurement data and image data that is input before and after a trigger is generated. At the time of saving the image data, the image data is associated with measurement data. The file saving processor 140 includes a post-trigger counter 142 for counting the number of pieces of image data after a trigger is generated. The file saving processing performed by the file saving processor 140 will be described later in detail.

The saving buffer region 150 is an operation area of the file saving processor 140, and is a storage region where measurement data, image data, and the like are temporarily stored. As illustrated in the drawing, the saving buffer region 150 includes a time-series measurement value buffer 151, an image ring buffer 152, and an image-attached measurement value file buffer 153.

The time-series measurement value buffer 151 is a buffer for temporarily storing measurement data. The time-series measurement value buffer 151 stores measurement data in a data structure, for example, as illustrated in FIG. 2. In the example of the drawing, measurement data is stored in time series using, as one record, a measurement value number 151$a$ for identifying measurement data, a time 151$b$ which is a time when a measurement value is input, and a measurement value 151$c$.

The image ring buffer 152 is a buffer for temporarily storing image data. The image ring buffer 152 prepares a data region where the given number (the number of pre-trigger image data) of image data before the trigger time point and the given number (the number of post-trigger image data) of image data after the trigger time point, which are to be described later, can be simultaneously stored in addition to at least the latest image data.

Figure 3:
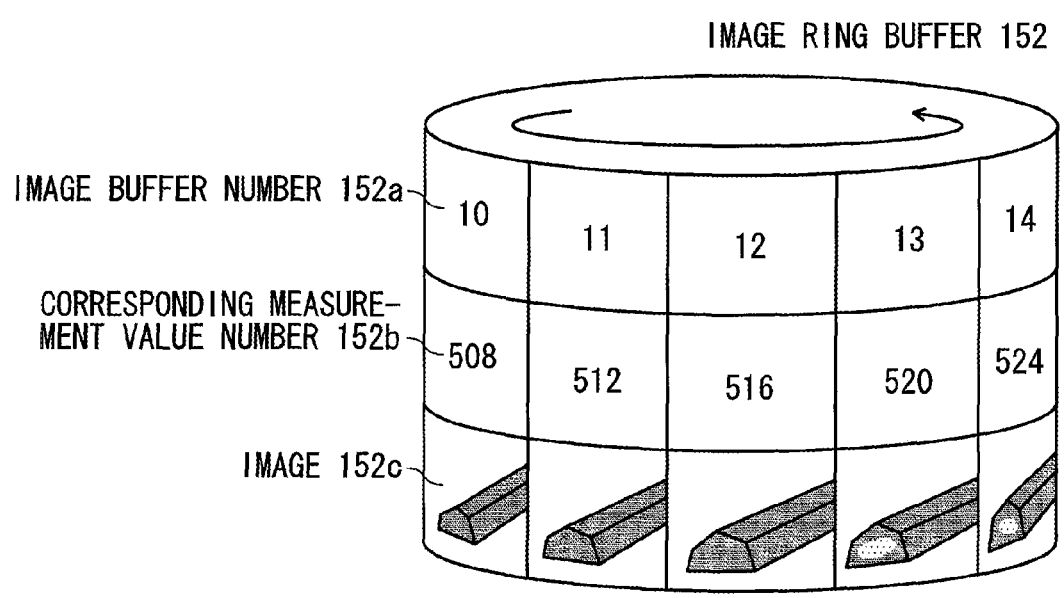
FIG. 3 is a diagram illustrating a data structure of an image ring buffer.

The image ring buffer 152 stores image data in a data structure, for example, as illustrated in FIG. 3. In the example of the drawing, image data is stored in an FIFO format using, as one record, an image buffer number 152$a$ for identifying an image buffer, a corresponding measurement value number 152$b$ indicating a measurement value number of measurement data input at the same time as when the stored image data is input, and an image 152$c$.

Referring back to FIG. 1, the file saving region 160 is a non-volatile storage region (for example, non-volatile memory) where an image-attached measurement value file 190 which is a recording result of the paperless recorder 100 is stored.

FIG. 4 is a diagram illustrating a data structure of the image-attached measurement value file 190. As illustrated in the drawing, the image-attached measurement value file 190 is a file in which four files or data of a time-series measurement value file 191, a numbered image file 192, file management data 193, and trigger group management data 194 are collectively archived in one file. Thus, since the corresponding measurement value and image are strongly associated with each other, the convenience of file management is improved.

The time-series measurement value file 191 is a file for saving a measurement value. As illustrated in the drawing, measurement data that is temporarily stored in the time-series measurement value buffer 151 is saved as it is in time series by using, as one record, the measurement value number 191$a$, the time 191$b$, and the measurement value 191$c$. It is preferable that the time-series measurement value file 191 be compatible with the time-series measurement value file 361 of the paperless recorder 300 of the related art.

The numbered image file 192 saves, in time series, image data before and after an alarm is generated, in pieces of image data that are temporarily stored in the image ring buffer 152 by using, as one record, an image number 192$a$ and an image 192$b$ which are sequential identifiers.

The file management data 193 is data for associating a measurement value of the time-series measurement value file 191 with an image of the numbered image file 192, and manages, as one record, a file management number 193$a$, a measurement value number 193$b$, and an image number 193$c$.

The trigger group management data 194 is data in which data regarding a generated trigger is stored as a trigger group, and is created as one record for each trigger. Each record is constituted by a trigger group management number 194$a$, a leading file management number 194$b$, a trigger point file management number 194$c$, an ending file management number 194$d$, an image number 194$e$, and an image cumulative number 194$f$.

The trigger group management number 194$a$ is a number for identifying a trigger group. The leading file management number 194$b$ is a file management number indicating leading image data included in the trigger group. The trigger point file management number 194$c$ is a file management number indicating image data corresponding to a point in time when an alarm serving as a trigger for creating the trigger group is generated. The ending file management number 194$d$ is a file management number indicating image data of an end point included in the trigger group. The image number 194$e$ of images is the number of pieces of image data included in the trigger group. The image cumulative number 194$f$ is a cumulative number up to image data included until the trigger group in the image-attached measurement value file 190.

Referring back to FIG. 1, the file reproduction buffer 170 is a buffer region that is used when the file reproduction processor 172 reproduces the image-attached measurement value file 190 stored in the file saving region 160. The file reproduction processor 172 reproduces the image-attached measurement value file 190 that is stored in the file saving region 160.

The display processor 180 performs trend display processing based on the measurement data that is input by the measurement value input processor 120 or reproduction display processing of the measurement data using the file reproduction processor 172, and displays a waveform, a value, and the like on the display device 182. The display device 182 is a touch panel-type display device.

Next, an operation of the paperless recorder 100 according to this embodiment which has the above-described configuration will be described. First, data collecting and saving operations of the paperless recorder 100 will be described with reference to a flowchart of FIG. 5. Herein, it is assumed that measurement data and image data are asynchronously input in a consecutive manner and the measurement data is frequently input.

The paperless recorder 100 performs initial setting prior to data collection (S101). Items of the initial setting include the number of pre-trigger image data, the number of post-trigger image data, a trigger condition, and a file saving timing.

The number of pre-trigger image data is the number of pieces of image data before a trigger is generated which are saved when the trigger is generated. The number of post-trigger image data is the number of pieces of image data after a trigger is generated which are saved when the trigger is generated. The number of pre-trigger image data and the number of post-trigger image data can also be changed during the data collection.

The trigger condition is an item to be set in regards to a condition serving as an image saving trigger. In this embodiment, since the generation of an alarm is used as a trigger, setting is performed with respect to an alarm generation condition. The alarm generation condition can be set to, for example, a case where a measurement value exceeds a predetermined value. In addition, in alarms that are generated, a specific alarm may be set as a trigger.

The file saving timing is an item to be set in regards to a timing when the image-attached measurement value file 190 is saved. In general, in a paperless recorder, a recorded file is divided under predetermined conditions for capacity limit and handling convenience of a file. The file saving timing is setting for establishing the conditions, and can be set depending on, for example, a file size, the number of measurement points, and a measurement time.

When the initial setting is completed, data collection is started (S102). When measurement data is received (S103: Yes), a measurement value is saved by the addition of the sequential measurement value number 151a and time 151b, which is timed by the timepiece 128, to the measurement value 151c of the time-series measurement value buffer 151 (S104). In addition, when trend display is performed, a display screen is updated when necessary (S105).

When image data is received at the same time as when measurement data is received (S106: Yes), processing at the time of receiving image data is performed (S107). In the determination of whether being the same time, the reception time is not required to be strictly set to the same time, but may be provided with predetermined duration.

Figure 6:
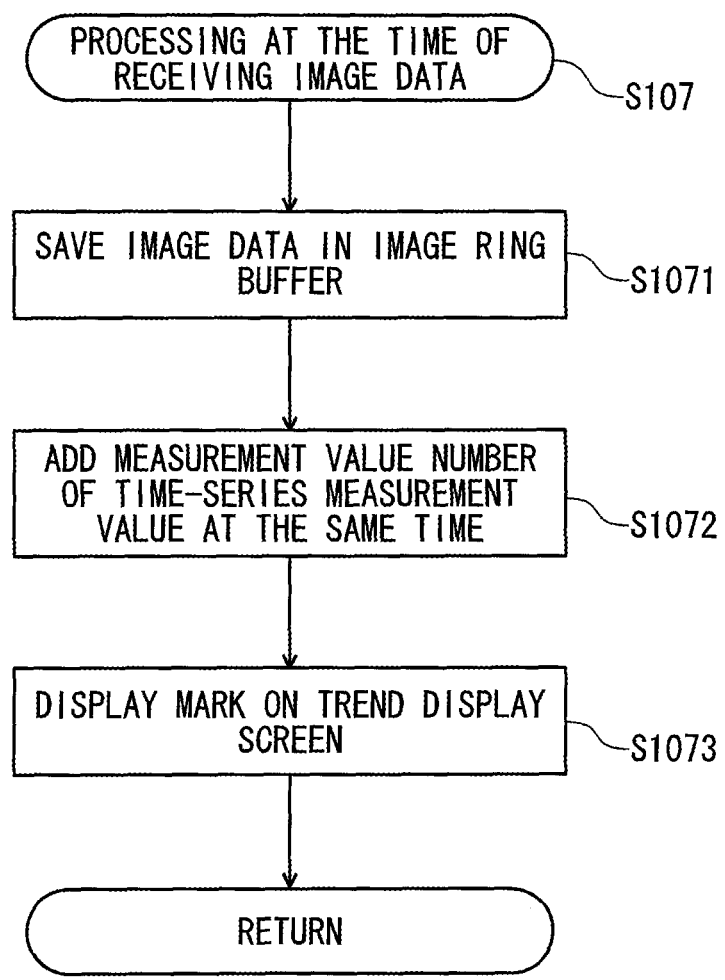
FIG. 6 is a flowchart explaining the processing at the time of receiving image data.

Here, the processing at the time of receiving image data (S107) will be described with reference to a flowchart of FIG. 6. First, the received image data is saved in the image 152c of the image ring buffer 152 (S1071). At this time, the measurement value number 151a added to measurement data that is received at the same time is recorded in the corresponding measurement value number 152b (S1072). Thus, an image and a measurement value at the same time are associated with each other.

Figure 11A:
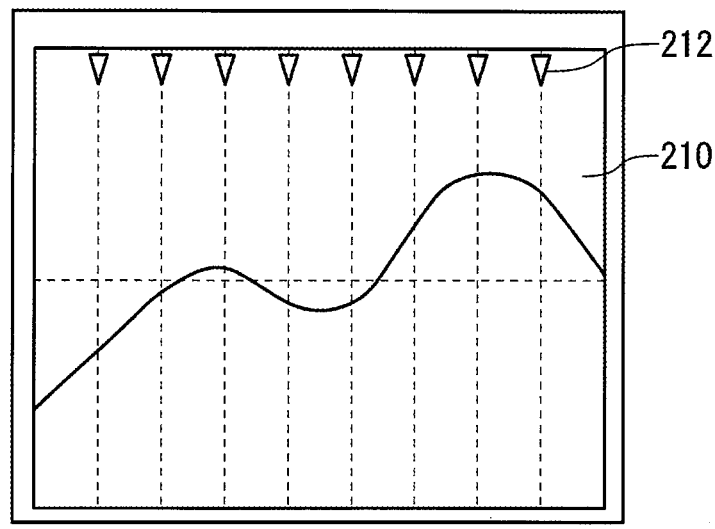
FIGS. 11A and 11B are diagrams explaining contents displayed on the paperless recorder.

In addition, a mark is displayed which indicates that an image corresponding to a trend display screen is present (S1073). This mark can be made by disposing a white inverted triangular mark 212 at a position corresponding a time when the image data is received, in a waveform display region 210 where a trend waveform is displayed, for example, as illustrated in FIG. 11A.

Figure 5:
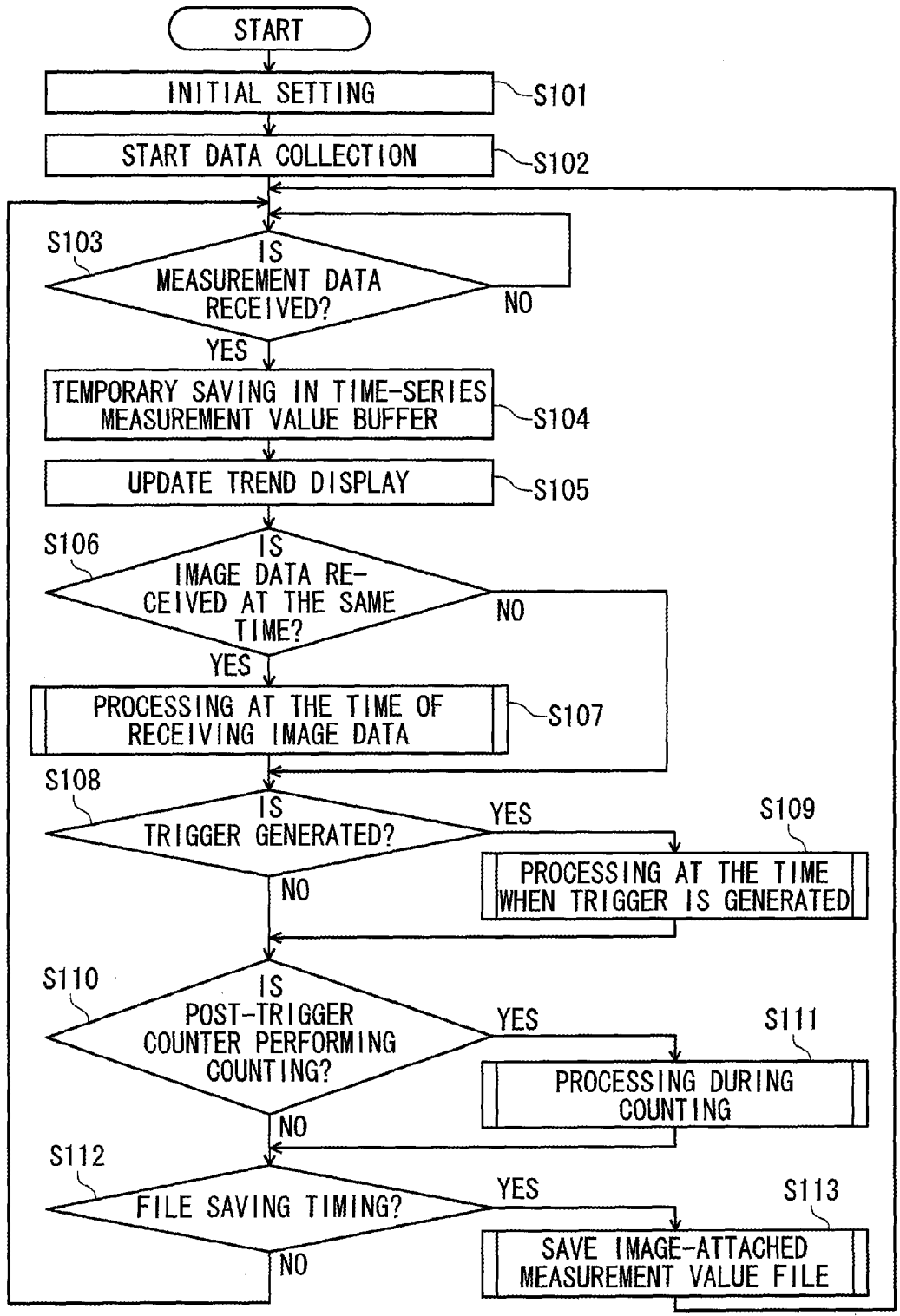
FIG. 5 is a flowchart explaining data collecting and saving operations of a paperless recorder.

Referring back to the flowchart of FIG. 5, when a trigger is generated (S108: Yes), processing at the time when the trigger is generated is performed (S109). In this embodiment, the generation of the trigger is a case where an alarm is generated by measurement data that is input.

Figure 7:
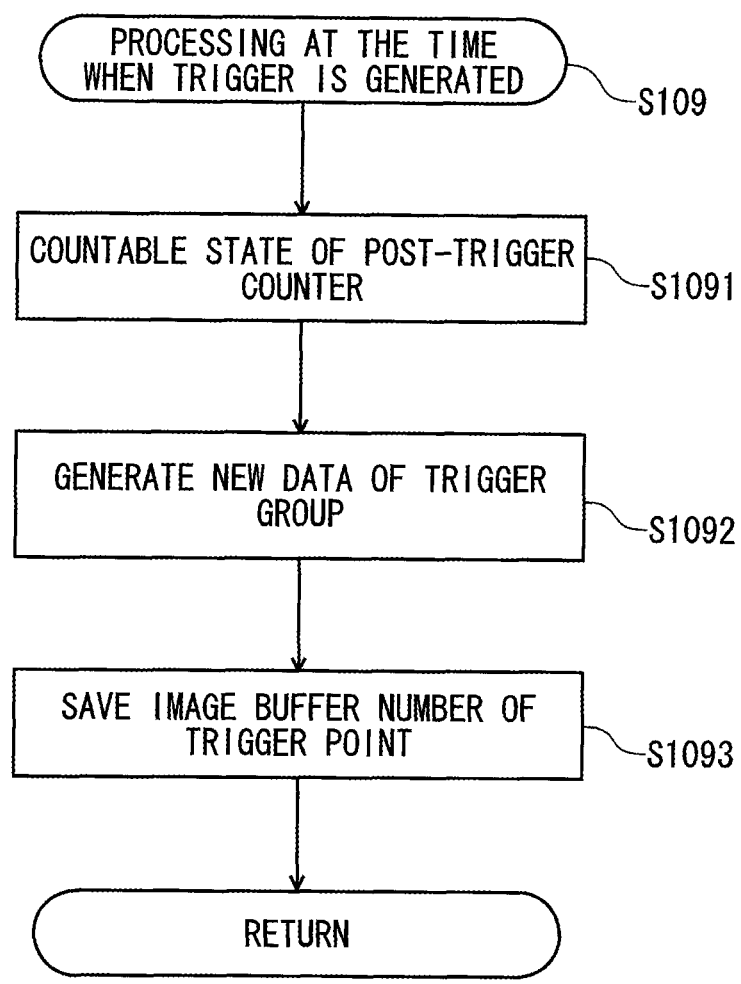
FIG. 7 is a flowchart explaining the processing at the time when an alarm is generated.

Here, the processing at the time when the trigger is generated (S109) will be described with reference to a flowchart of FIG. 7. When the trigger is generated, the file saving processor 140 resets the post-trigger counter 142 so as to be in a countable state (S1091). However, since the post-trigger counter 142 is a counter that counts the number of images, incrementing is not performed at this point in time. The post-trigger counter 142 terminates the counting with the number of post-trigger image data which is set in the initial setting (S101).

In the image-attached measurement value file buffer 153, new trigger group data of the trigger group management data 194 is created, and the trigger group management number 194a is recorded (S1092). In addition, the most recent image buffer number of the image ring buffer 152 at a trigger time point is temporarily saved (S1093).

Referring back to the flow char of FIG. 5, when the post-trigger counter 142 is performing counting (S110: Yes), processing is performed during the counting (S111).

Figure 8:
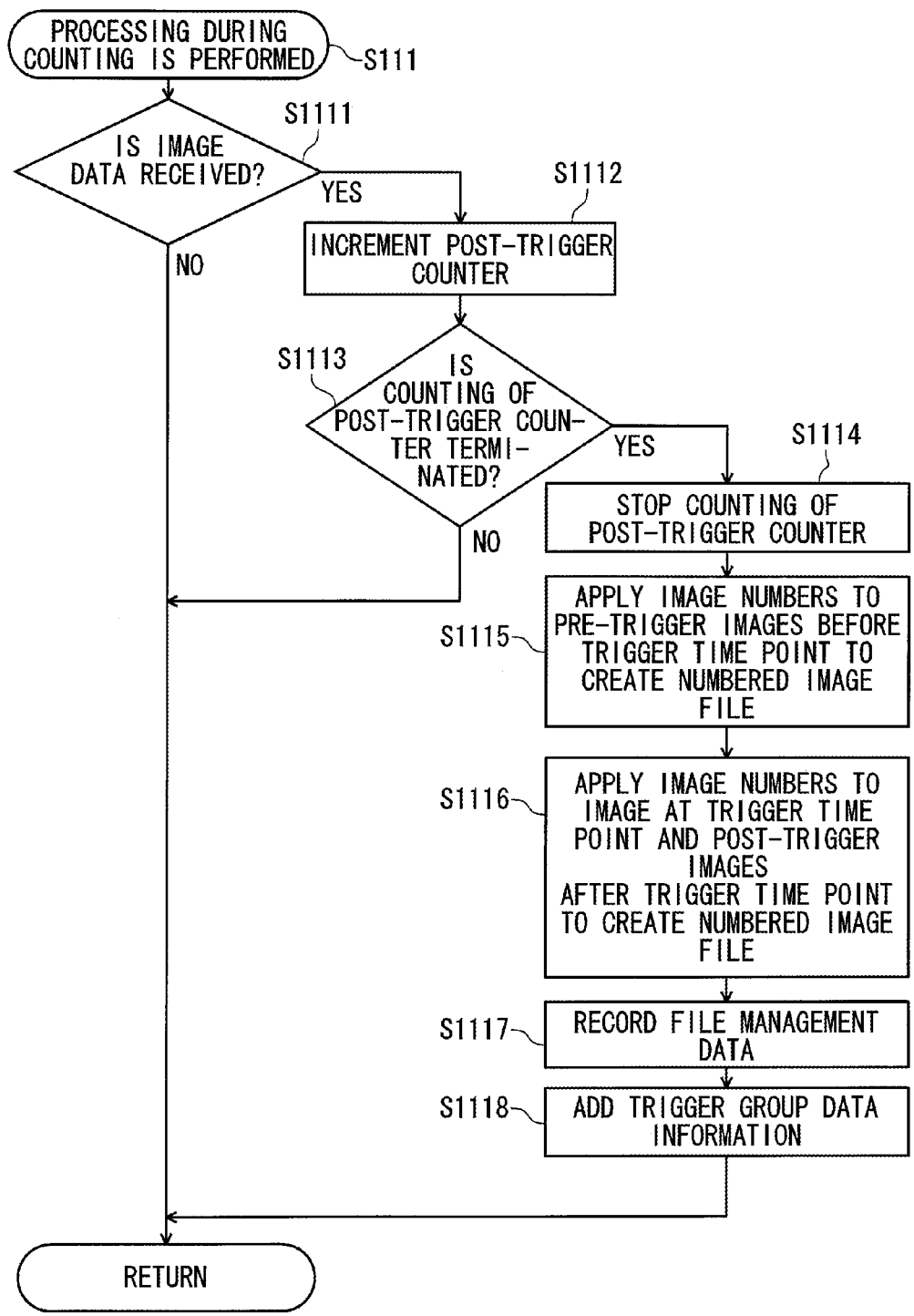
FIG. 8 is a flowchart explaining the processing performed during counting.

Here, the processing performed during counting (S111) will be described with reference to a flowchart of FIG. 8. When the image data is received in the processing (S106) (S1111: Yes), the post-trigger counter 142 is incremented (S1112).

As a result of the incrementing of the post-trigger counter 142, when the counting of the post-trigger counter 142 is terminated (S1113: Yes), that is, when the given number (the number of post-trigger image data) of pieces of image data are received after the trigger is generated, the counting of the post-trigger counter 142 is stopped (S1114). Thus, the counting state is released thereafter.

The given number (the number of pre-trigger image data) of pieces of image data before a trigger time point are read out from image ring buffer 152 based on the image buffer number saved in the processing (S1093) of the image ring buffer 152 at the trigger time point and are recorded in the image 192b of the numbered image file 192 in the image-attached measurement value file buffer 153 (S1115). At this time, a unique number is recorded in the image number 192a.

In addition, the image data at the trigger time point and the given number (the number of post-trigger image data) of pieces of image data after the trigger time point are read out from the image ring buffer 152 and are recorded in the image 192b of the numbered image file 192 in the image-attached measurement value file buffer 153 (S1116). At this time, a sequential number is recorded in the image number 192a.

At this point in time, since the image number 192a of the image data which is saved in the numbered image file 192 is established, the measurement value number 193b and the image number 193c are recorded in the file management data 193, in addition to the sequential file management number 193a, in the image-attached measurement value file buffer 153 (S1117). Meanwhile, the measurement value number 193b can be specified with reference to the corresponding measurement value number 152b of the image ring buffer 152.

In addition, since pieces of information of the trigger group data are also established by information being recorded in the file management data 193, pieces of information of the leading file management number 194b, the trigger point file management number 194c, the ending file management number 194d, the image number 194e, and the image cumulative number 194f are recorded (S1092) in the trigger group data that is created in the processing (S1118).

Referring back to the flowchart of FIG. 5, in the case of the file saving timing (S112: Yes) according to the file saving condition that is set in the initial setting (S101), the processing of saving the image-attached measurement value file is performed (S113), and the reception of the next measurement data is waited for (S103).

Figure 9:
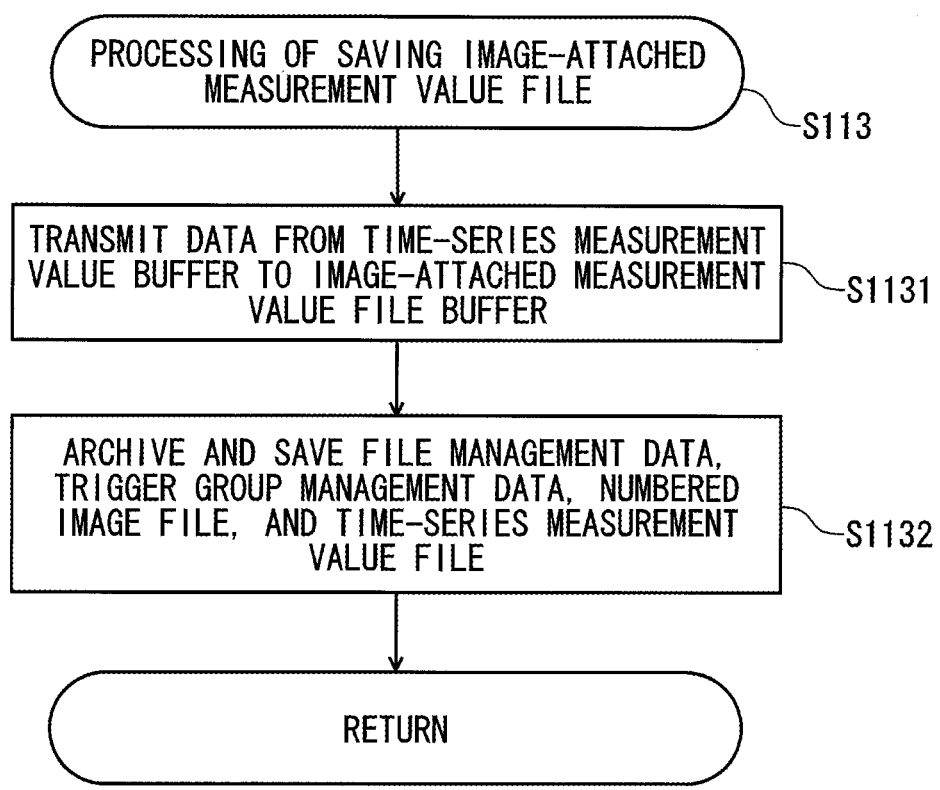
FIG. 9 is a flowchart explaining the processing of saving the image-attached measurement value file.

Here, the processing of saving the image-attached measurement value file (S113) will be described with reference to a flowchart of FIG. 9. Since the numbered image file 192, the file management data 193, and the trigger group management data 194 are stored in the image-attached measurement value file buffer 153 by the above-described processing, data saved in the time-series measurement value buffer 151 is transmitted to the time-series measurement value file 191 of the image-attached measurement value file buffer 153 (S1131).

The time-series measurement value file 191, the numbered image file 192, the file management data 193, and the trigger group management data 194 which are recorded in the image-attached measurement value file buffer 153 are archived in one image-attached measurement value file 190 and are saved in the file saving region 160 (S1132).

Up to here, the data collecting and saving operations of the paperless recorder 100 have been described.

Figure 10:
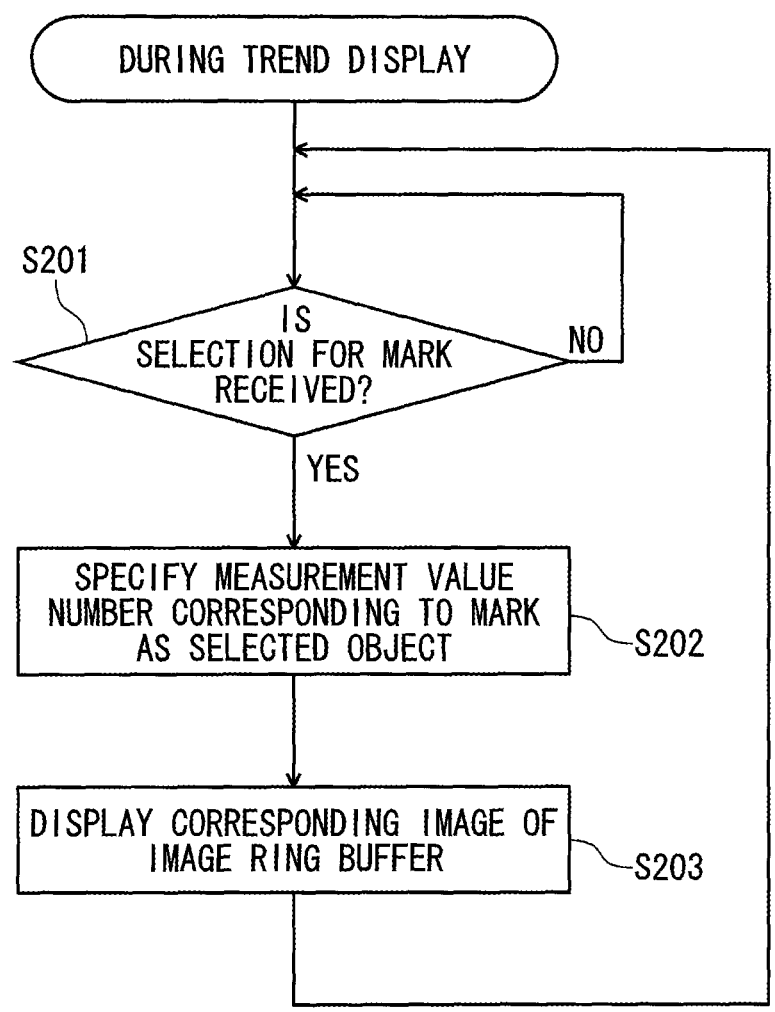
FIG. 10 is a flowchart explaining an operation during trend display in the paperless recorder.

Next, an operation during trend display in the paperless recorder 100 will be described with reference to a flowchart of FIG. 10. When any one mark 212 is selected by a user during trend display illustrated in FIG. 11A (S201: Yes), the measurement value number 151a corresponding to the mark which is a selected object is specified with reference to the time-series measurement value buffer 151 (S202). Meanwhile, the selection of the mark 212 can be received from a user by an operation using a touch panel, an operation using an operation key not shown in the drawing, or the like.

Figure 11B:
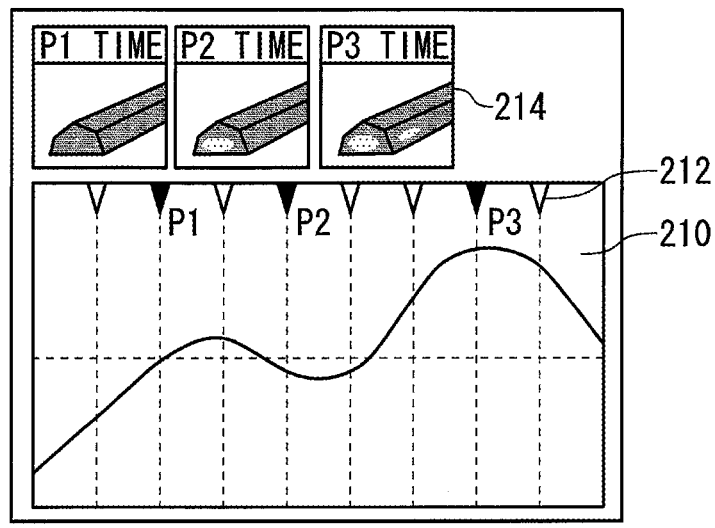

The images 152c corresponding to the specified measurement value numbers 151a and 152b are read out from the image ring buffer 152 and are displayed on the trend display screen (S203). FIG. 11B illustrates an example of the trend display screen on which an image is displayed.

In the trend display screen, the mark 212 which is selected by a user and has the corresponding image displayed therein is displayed in black, and thus the mark can be distinguished from a mark which does not have the corresponding image displayed therein. In the example of the drawing, although an image 214 is displayed above the waveform display region 210, another display method may be used. For example, the image 214 may be displayed by overlapping the waveform display region 210. In addition, it is preferable that the plurality of images 214 be capable of being displayed.

Figure 12:
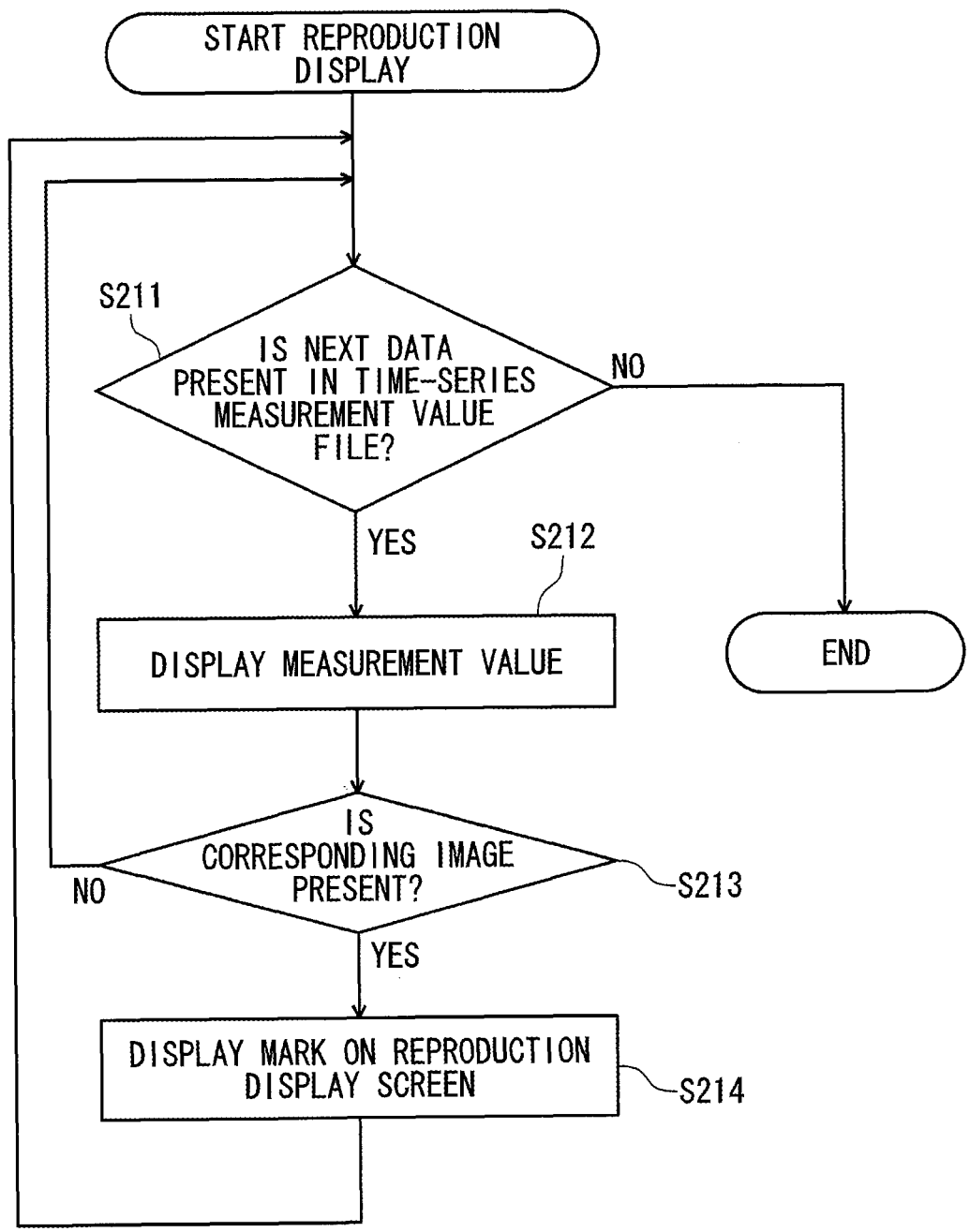
FIG. 12 is a flowchart explaining reproduction and display operations of the image-attached measurement value file that is recorded in a file saving region.

Next, reproduction and display operations of the image-attached measurement value file 190 that is recorded in the file saving region 160 will be described with reference to a flowchart of FIG. 12. When an instruction to reproduce the image-attached measurement value file 190 is received from a user, the following process is repeatedly performed on pieces of measurement data which are recorded in the time-series measurement value file 191 of the image-attached measurement value file 190 (S211).

First, the measurement value 191 c of the time-series measurement value file 191 is read out to display a waveform on a reproduction display screen (S212). Then, it is determined whether an image corresponding to the measurement value is present, with reference to the file management data 193 (S213).

As a result, when the corresponding image is present (S213: Yes), a mark is displayed at a corresponding position of the reproduction display screen. The mark in the reproduction display screen can be configured in a similar manner to the mark in the trend display screen illustrated in FIG. 11A.

Figure 13:
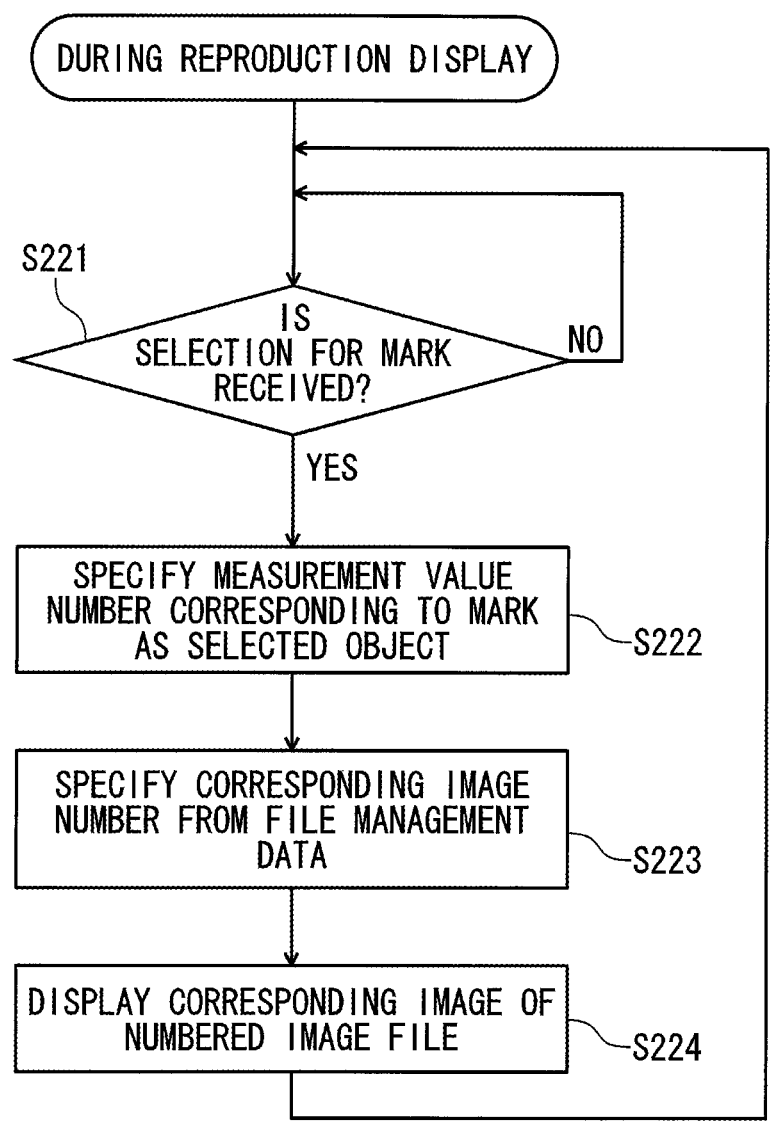
FIG. 13 is a flowchart explaining an operation during the reproduction of the image-attached measurement value file.

Next, an operation during the reproduction of the image-attached measurement value file 190 that is recorded in the file saving region 160 will be described with reference to a flowchart of FIG. 13. When any one mark is selected by a user during the reproduction display of the image-attached measurement value file 190 (S221: Yes), a measurement value number corresponding to a mark which is a selected object is specified with reference to the time-series measurement value file 191 (S222).

The image number 193c corresponding to the specified measurement value number is specified with reference to the file management data 193 (S223), and the image 192b corresponding to the specified image number is read out from the numbered image file 192 and is displayed on the reproduction display screen (S224). An image displayed on the reproduction display screen can be configured in a similar manner to the image that is displayed on the trend display screen illustrated in FIG. 11B.

Up to here, the paperless recorder 100 according to this embodiment has been described. Meanwhile, the recorder of the present invention is not limited to the configuration of the paperless recorder 100 according to the above-described embodiment and can be modified in various ways.

Figure 14:
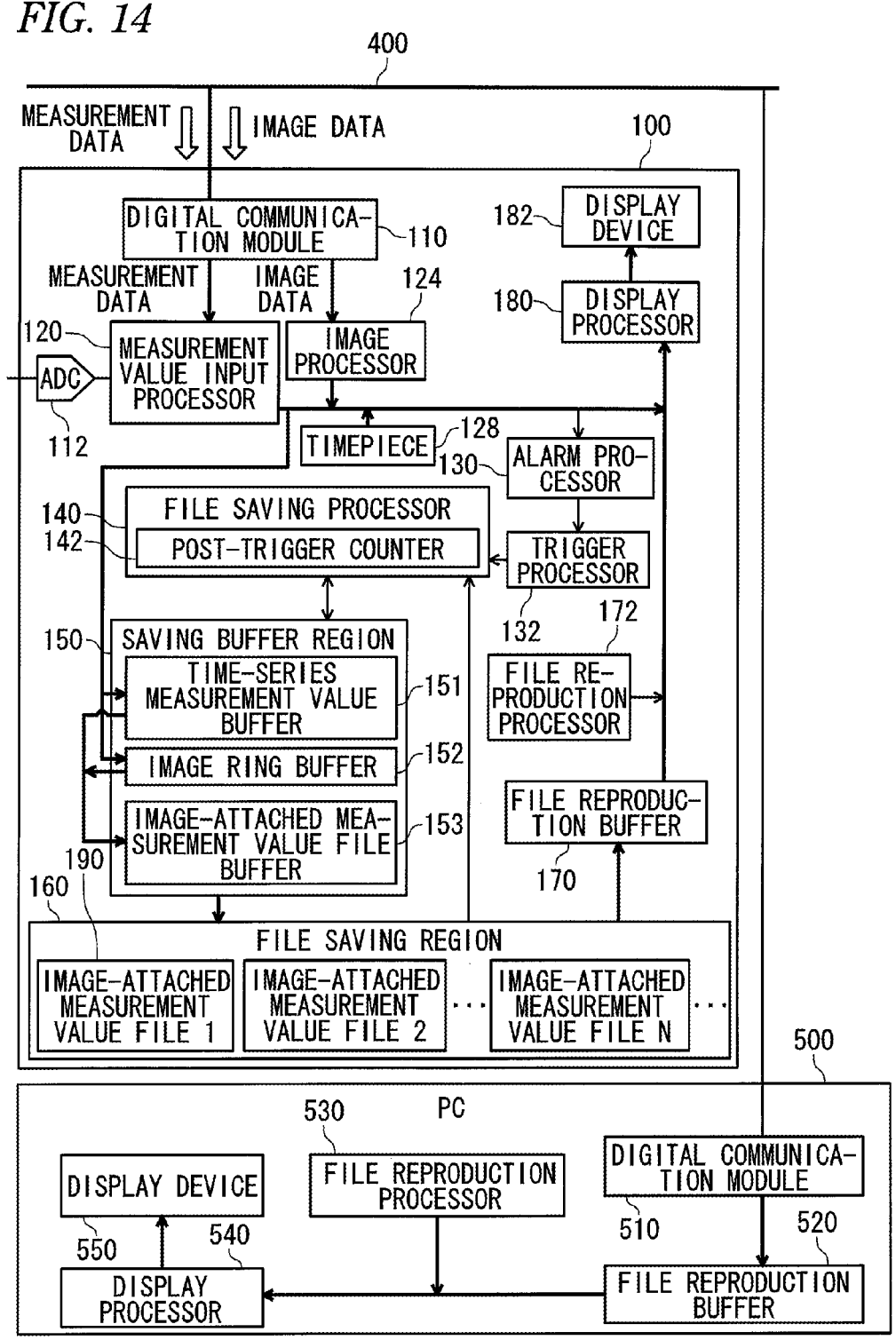
FIG. 14 is a block diagram illustrating a first modified example of the present invention.

For example, in the above-described embodiment, although the image-attached measurement value file 190 is reproduced in the paperless recorder 100 and is displayed on the display device 182 of the paperless recorder 100, the image-attached measurement value file 190 may be reproduced on a PC 500 connected thereto through the network communication path 400 and may be displayed on a display device 550 of the PC 500 as illustrated in FIG. 14.

In this case, a digital communication module 510, a file reproduction buffer 520, a file reproduction processor 530, and a display processor 540 which have the same functions as the respective blocks of the paperless recorder 100 are constructed in the PC 500, and the digital communication module 510 acquires the image-attached measurement value file 190 from the paperless recorder 100 through the network communication path 400 and stores the acquired file in the file reproduction buffer 520. Then, the file reproduction processor 530 performs reproduction processing, and thus a measurement value and an associated image can be displayed on the display device 550 of the PC 500.

Figure 15:
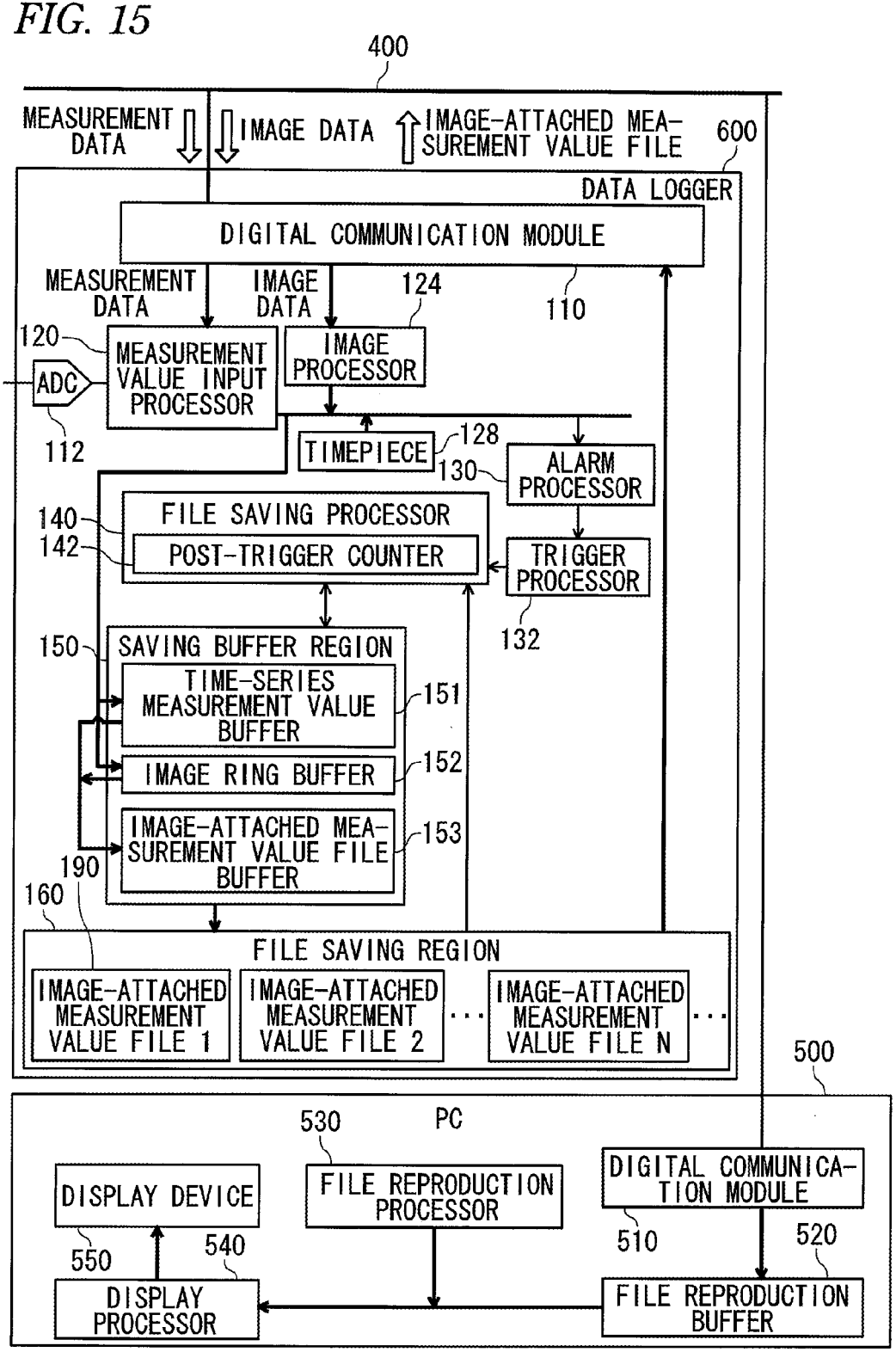
FIG. 15 is a block diagram illustrating a second modified example of the present invention.

In addition, in the above-described embodiment, although a description has been made of a case where the measuring equipment of the present invention is applied to the paperless recorder 100, the measuring equipment of the present invention can also be applied to a data logger 600 as illustrated in FIG. 15.

Since the data logger 600 does not have a display function, the data logger has a configuration in which the file reproduction buffer 170, the file reproduction processor 172, the display processor 180, and the display device 182 are excluded from the paperless recorder 100, and has the same configuration as the paperless recorder 100 with regard to other blocks. For this reason, the same reference numerals are attached for convenience. In this case, trend display and reproduction display which are similar to those in the above-described embodiment can be performed by the PC 500 connected thereto through the network communication path 400.

Figure 16:
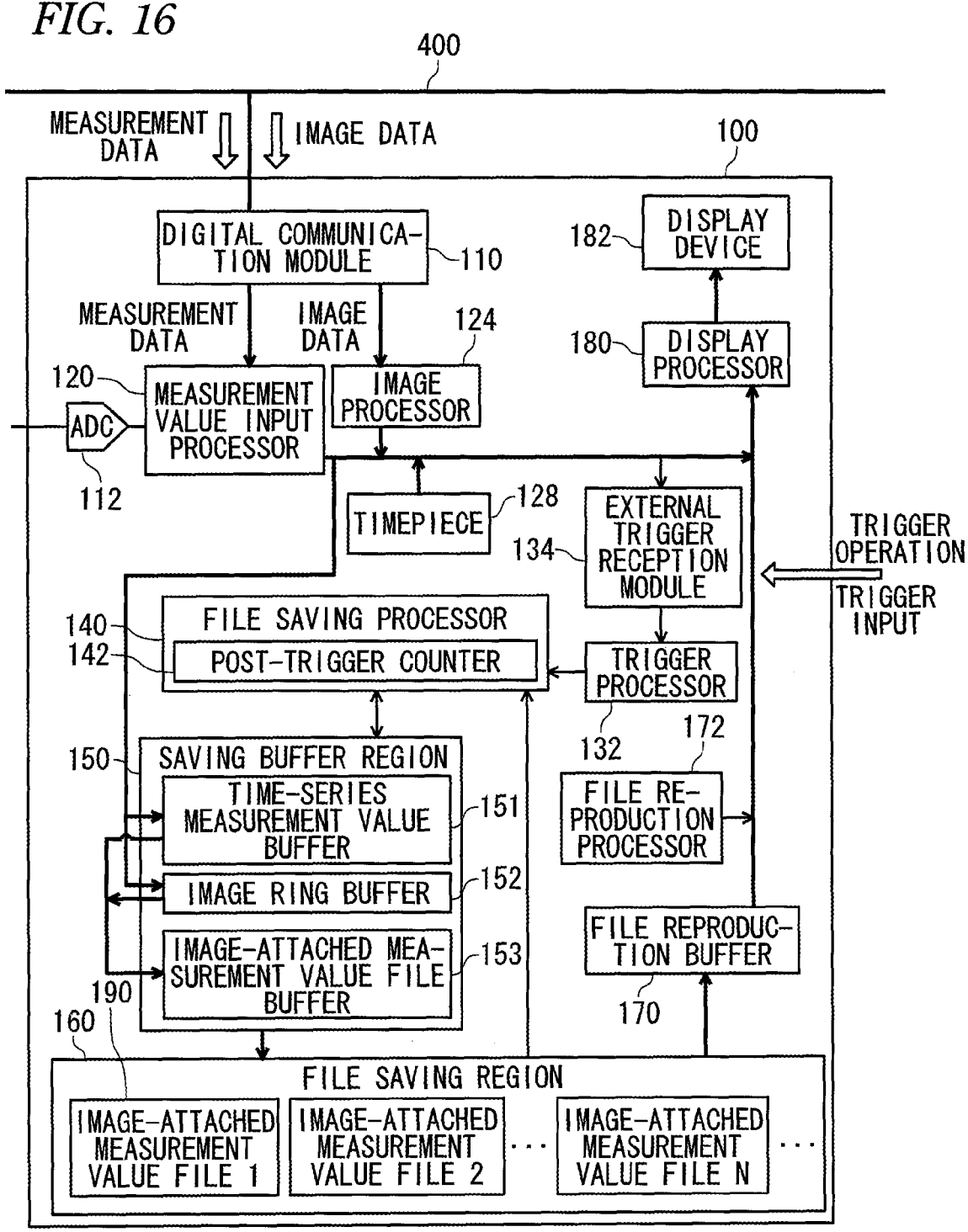
FIG. 16 is a block diagram illustrating a third modified example of the present invention.

In addition, in the above-described embodiment, although the generation of an alarm is used as a trigger of image data saving, other factors may be used as a trigger of image data saving. For example, as illustrated in FIG. 16, an external trigger reception module 145 can be provided in the paperless recorder 100 so that a user's trigger operation or a predetermined trigger input from another device can be used as a trigger of image data saving.

Figure 17A:
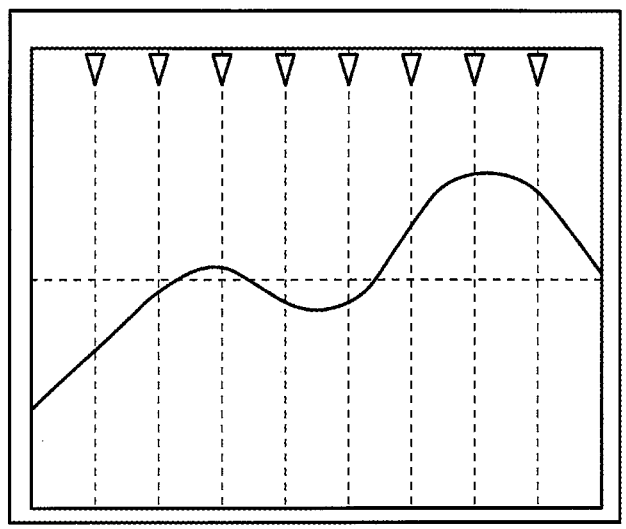
FIGS. 17A and 17B are diagrams illustrating user's trigger operations.

The user's trigger operation can be received through a saving trigger button 136, for example, as illustrated in FIG. 17A. An external trigger reception unit 134 generates a trigger at a point in time when the operation of the saving trigger button 136 is received, and saves images before and after the trigger.

Figure 17B:
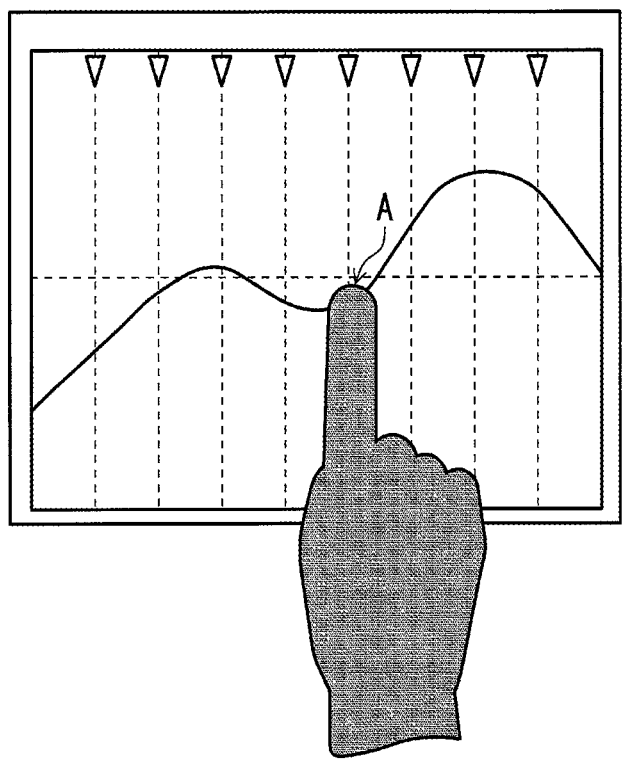

Alternatively, as illustrated in FIG. 17B, a trigger operation may be received by a selection of any point on a waveform through an operation using a touch panel. The external trigger reception module 134 generates a trigger at a time corresponding to a measurement value having received a touch operation and saves images before and after the trigger. In the example of the drawing, a trigger is regarded as being generated at a time when a measurement value corresponding to a point A on a waveform is input. In this case, since the trigger is generated backwards, the capacity of the image ring buffer 152 is increased.

In addition, in the above-described embodiment, the time-series measurement value file 191, the numbered image file 192, the file management data 193, and the trigger group management data 194 are archived in one image-attached measurement value file 190 and are saved in the file saving region 160, but the time-series measurement value file 191, the numbered image file 192, the file management data 193, and the trigger group management data 194 are sufficient if they are associated with each other, and are not necessarily archived in one file. For example, they may be stored in the same folder, or file names that are clearly associated with each other may be attached thereto.

Alternatively, the time-series measurement value file 191, the numbered image file 192, the file management data 193, and the trigger group management data 194 may be configured as one file without being archived. In this case, the image-attached measurement value file may be divided into four regions, and contents of the time-series measurement value file 191, the numbered image file 192, the file management data 193, and the trigger group management data 194 may be recorded in the respective regions.

Meanwhile, image data from the plurality of digital communication output cameras 410 may be received. In this case, the image data may be associated with measurement data based on a reception time. In addition, a measurement function may be added to the digital communication output camera 410, and measurement data and image data may be received from the digital communication output camera 410.

What is claimed is:

1. A recorder which receives measurement data and image data, comprising:
a file saving processor configured to:
record the measurement data in a first file in time series;
temporarily store the image data with information for associating the image data with the measurement data that is regarded as being received at the same time;
record, in a second file, image data corresponding to a point in time when a trigger is generated, and also a given number of image data before the trigger is generated and a given number of image data after the trigger is generated;
create a third file in which the measurement data recorded in the first file and the image data recorded in the second file are associated with each other; and
associate the first file, the second file, and the third file with each other to save the associated files.

2. The recorder according to claim 1, further comprising:
a display processor configured to control a display device to display a waveform of measurement data which is being received,
wherein the display processor is configured to control the display device to additionally display a mark on the measurement data with which the temporarily stored image data is associated.

3. The recorder according to claim 2, wherein when a selection of the mark is received, the display processor controls the display device to display image data that is associated with measurement data corresponding to the selected mark.

4. The recorder according to claim 1, further comprising:
a reproduction processor configured to control a display device to display a waveform of the measurement data recorded in the first file,
wherein the reproduction processor is configured to control the display device to additionally display a mark on the measurement data with which the image data recorded in the second file is associated.

5. The recorder according to claim 4, wherein when a selection of the mark is received, the reproduction processor controls the display device to display image data that is associated with measurement data corresponding to the selected mark.

6. The recorder according to claim 1, wherein the file saving processor is configured to archive the first file, the second file, and the third file in one file to associate the files with each other.

7. The recorder according to claim 1, wherein the file saving processor is configured to record contents of the first file, the second file, and the third file in one file to associate the files with each other.

8. The recorder according to claim 1, wherein the trigger is generation of an alarm which is caused by the received measurement data.

9. The recorder according to claim 1, wherein the trigger is based on a user's operation.

10. The recorder according to claim 9,
wherein the user's operation is a selection for a waveform which is being displayed, and wherein the file saving processor is configured to regard a trigger as being generated at a time when measurement data to be selected in the waveform is received.

11. The recorder according to claim 1, wherein the temporarily stored image data is stored in a FIFO format.

* * * * *